US006286812B1

(12) United States Patent
Cherry

(10) Patent No.: US 6,286,812 B1
(45) Date of Patent: Sep. 11, 2001

(54) PORTABLE LIFTING APPARATUS

(75) Inventor: Charles W. Cherry, Edmond, OK (US)

(73) Assignee: Autoquip Corporation, Guthrie, OK (US)

( * ) Notice: Subject to any disclaimer, the term of this patent is extended or adjusted under 35 U.S.C. 154(b) by 0 days.

(21) Appl. No.: 09/536,193

(22) Filed: Mar. 27, 2000

(51) Int. Cl.[7] ........................................ B60P 1/48

(52) U.S. Cl. .......................... 254/9 C; 254/122; 254/126; 254/93 HP; 254/8 B

(58) Field of Search .............................. 254/126, 122, 254/8 R, 8 B, 931 HP, 2 C, 9 C

(56) References Cited

U.S. PATENT DOCUMENTS

| | | | | |
|---|---|---|---|---|
| 3,174,722 | * | 3/1965 | Alm | 254/122 |
| 3,350,065 | * | 10/1967 | Mankey | 254/122 |
| 3,472,488 | * | 10/1969 | Naughton | 254/122 |
| 3,730,366 | * | 5/1973 | Berends | 254/122 |
| 3,994,474 | * | 11/1976 | Finkbeiner | 254/88 |
| 4,688,760 | | 8/1987 | Garman et al. | 254/93 HP |
| 4,786,032 | | 11/1988 | Garman et al. | 254/93 HP |
| 5,419,534 | | 5/1995 | Vesely | 254/9 |
| 5,431,112 | | 7/1995 | Thompson | 108/7 |
| 5,446,938 | | 9/1995 | Warner et al. | 14/71.3 |
| 5,542,806 | | 8/1996 | Kang | 414/422 |
| 5,649,491 | | 7/1997 | Zaguroli, Jr. | 108/7 |
| 5,771,816 | * | 6/1998 | Zaguroli, Jr. | 254/122 |
| 5,890,436 | | 4/1999 | Thompson | 108/7 |

* cited by examiner

*Primary Examiner*—Joseph J. Hail, III
*Assistant Examiner*—Lee Wilson
(74) *Attorney, Agent, or Firm*—John W. Harbst

(57) ABSTRACT

A lifting apparatus which is readily portable between locations and whose design allows for readily replacement and/or repair of component parts thereof to enhance both serviceability and maintenance of the lifting apparatus is disclosed. The lifting apparatus includes a support table, a base frame disposed beneath the support table, a linkage assembly for maintaining the table and the base frame in generally parallel relation relative to each other as the table moves between raised and lowered positions, and a pneumatically operated actuator for moving the table between the raised and lowered positions. The base frame of the lifting apparatus defines at least one opening for allowing tines of a moving device to be inserted therethrough, thus, allowing the lifting apparatus of the present invention to be readily transported between locations. Fasteners used to releasably secure the pneumatically operated actuator to the base frame are elevated above the surface on which the lifting apparatus is positioned thereby enhancing serviceability of the pneumatically operated actuator. Additionally, the base frame includes gib structure arranged in operable combination with the linkage assembly and which includes releasable structure for enhancing service access to rollers forming part of the linkage assembly.

18 Claims, 5 Drawing Sheets

PORTABLE LIFTING APPARATUS

FIELD OF THE INVENTION

The present invention generally relates to a lifting apparatus and, more particularly, to a portable lifting apparatus including a base frame, a support platform or table disposed above the base frame, a linkage assembly for connecting the support platform to the base frame while maintaining the support platform and base frame in generally parallel relation relative to each other, and a pneumatic actuator for elevationally moving the support platform relative to the base frame.

FIELD OF THE INVENTION

Lifting devices including a support platform connected to a base as through a scissor linkage assembly and which elevationally moves under the influence of a fluid operated system are known in the art. Many conventional lifting devices include a base comprised of a series of members arranged in a rectangular pattern and a floor plate which rigidly interconnects the members of the base. During their operation, the floor plate of such lifting devices is typically secured to a floor or ground surface as through lag bolts or the like to add strength and rigidity to the base and, thus, the lifting device. As will be readily appreciated, requiring such lifting devices to be secured in position severely limits their versatility and use.

Considerable weight may have to be supported by the platform of such lifting devices. Moreover, the elevational position of the support platform relative to the base may frequently change during operation of the lifting device. Accordingly, the fluid operated system of the lifting device is usually subject to the control of an operator. In many lifting devices, the fluid operated system includes an air spring or pneumatic actuator connected to a source of fluid pressure as through an operator controlled valve. Such an air spring typically includes an expandable/contractible bellows defining a variable volume chamber.

Because the bellows of such an air spring is continually expanded and retracted during operation, the walls of the bellows sometimes fail as a result of the stresses placed thereon. Besides the continuous expansion and retraction of the bellows, air springs have been known to fail for several other reasons and generally without any indication of their impending failure. Of course, failure of the air spring or bellows renders the lifting device inoperable. The bellows is typically carried between and sealed to a top plate and a bottom plate which are releasably secured as through fasteners to the scissor linkage assembly and the base frame, respectively.

As is well known in the art, replacement of the air spring has heretofore frequently involved a time consuming and tedious task. Access to the fasteners used to secure the top plate to the scissor linkage assembly are usually readily available and, thus, cause minimum problems. The fasteners used to releasably secure the bottom plate to the base frame, however, are considerably more troublesome. That is, access to the fasteners used to secure the lower plate of the air spring to the base frame is severely limited. Thus, the lifting device is often inverted or turned upside down from its normal operational position to gain access to such fasteners. Of course, having to locate suitable equipment capable of raising and inverting the lifting device exacerbates the problem of replacing/repairing the air spring, thus, adding to the downtime for the lifting device during its repair.

To permit the support platform to remain generally parallel to the base frame during operation of the lifting device, one end of the linkage assembly is required to slide along a predetermined linear path of travel relative to the base frame in response to elevational movements of the lifting device. Of course, there is a degree of friction involved as a result of the relative movement and metal to metal contact between sliding link ends of the linkage assembly and the base frame. Besides the gravitational weight of the support platform and fluid operated system, this friction engagement problem is exacerbated by the weight of any articles supported by the platform.

To significantly reduce the frictional engagement between the sliding link ends of the linkage assembly and the base frame, some lifting devices provide free turning rollers at the link ends. To allow the linkage assembly to upwardly move the table in response to expansion of the bellows of the air spring, each free turning roller at the end of the link is typically positioned or movably entrapped within gib structure. As will be appreciated by those skilled in the art, such gib structure limits movement of the roller along a predetermined path of travel and between set limits.

As a result of their substantially continuous movements, the rollers operably associated with such linkage assembly require regular maintenance and, occasionally, are required to be replaced. Heretofore known gib structures on the base frame, however, significantly hinder access to the rollers to provide regular maintenance thereon and/or replacement of such rollers. As with the fasteners used to releasably secure the air spring assembly to the base frame, the inability to gain access to the rollers provided to enhance operation of the linkage assembly presents a significant and well known problem with heretofore known lifting devices.

Thus, there remains a need and a desire for a lifting apparatus which is readily portable between locations and whose design allows for ready replacement and/or repair of the air spring assembly and access to the rollers used in combination with the linkage assembly thereby enhancing serviceability and maintenance.

SUMMARY OF THE INVENTION

In view of the above, and in accordance with the present invention, there is provided a lifting apparatus which is readily portable between locations and whose design allows for ready replacement and/or repair of component parts thereof to enhance both serviceability and maintenance of the lifting apparatus. In general, the lifting apparatus of the present invention includes a support table, a base frame disposed beneath the support table, a linkage assembly for maintaining the table and the base frame in generally parallel relation relative to each other as the table moves between raised and lowered positions, and a pneumatically operated actuator for moving the table between the raised and lowered positions.

One of the salient features of the present invention relates to the structural rigidity of the lifting apparatus. As will be appreciated from an understanding thereof, the structural rigidity of the lifting apparatus of the present invention allows the lifting apparatus to be moved between locations thereby promoting the versatility and usefulness of the lifting apparatus. In a preferred form of the invention, the rigid base frame is configured to accommodate laterally spaced tines of a moving device, such as a fork lift or pallet jack. As such, the lifting apparatus of the present invention can be readily and easily moved between location as required by the user thereof.

In a most preferred form, the rigid base frame includes a pair of rigid elongated and spaced end members disposed in generally parallel relation relative to each other and a pair of rigid elongated and spaced side members disposed in generally parallel relation relative to each other. The end members and side members are rigidly interconnected in vertically spaced relation relative to each other. One pair of the members for the base frame defines a surface for engaging that surface on which the lifting apparatus is to be disposed. As will be appreciated, the vertical spacing between the pairs of members defines an opening for accommodating the laterally spaced tines of the mobile device. To add further strength and structural rigidity thereto, the base frame can further include an elongated support member. Such elongated support member is preferably disposed between and rigidly connected toward opposite ends of that pair of members which are elevated from that pair of members defining the surface for engaging the support surface on which the lifting apparatus of the present invention normally rests.

Structural rigidity for the lifting apparatus is further aided by the preferred configuration of the pairs of members used to form the base frame. That is, to promote the structural rigidity of the base frame and thereby the portability of the lifting apparatus, each end member and each side member has a generally L-shaped configuration. Preferably, a longer leg of each L-shaped member is secured to each other and is disposed in generally vertical orientation when the base frame is assembled thereby inherently promoting the strength of the base frame without requiring additional support from the floor thereby yielding additional strength characteristics to the portable lifting apparatus.

Another salient aspect of the present invention relates to enhanced access to the fasteners used to releasably secure the pneumatically operated actuator to the base frame of the lifting apparatus. A common pneumatically operated actuator for lifting devices involves a top plate, a bottom plate, and an air bag which expands and retracts as a function of fluid volume therewithin. The top plate of the pneumatically operated actuator is sealed to the air bag and is connected, as with fasteners, to the linkage assembly. The top plate fasteners readily allow the top plate to be removably attached from the linkage assembly thereby allowing the pneumatically operated actuator to be replaced when required. The bottom plate is also operably sealed to the air bag.

Like heretofore known lifting devices, the bottom plate of the pneumatically operated actuator for the lifting apparatus of the present invention is releasably secured, as with fasteners, to the base frame. To enhance access to the fasteners used to releasably secure the bottom plate of the pneumatically operated actuator to the base frame, however, the bottom plate of the lifting apparatus of the present invention is fastened to the base frame at a distance elevated from the support surface on which the base frame rests.

In a preferred form the invention, the bottom plate of the pneumatically operated actuator is releasably fastened to the base frame in elevationally raised relation from the surface on which the base frame rests. In a most preferred form of the invention, the bottom plate of the pneumatically operated actuator is releasably fastened to the support member extending between and fastened toward opposite ends to those pair of members of the base frame disposed in elevationally raised relation to that pair of members which define the planar surface on which the base frame rests. As such, enhanced access to the fasteners used to releasably secure the pneumatically operated actuator to the base frame is provided by the preferred design of the present invention. As will be appreciated by those skilled in the art, enhanced and ready access to such fasteners translates to reduced time spent in repairing and/or replacing the pneumatically operated actuator of the lifting apparatus of the present invention and, thus, reduced downtime for repairs.

Still another aspect of the present invention relates to the ability to readily and quickly provide maintenance to components of the linkage assembly forming part of the lifting apparatus of the present invention. In a preferred form of the invention, the linkage assembly includes a pair of scissor-linkages disposed in generally parallel relationship relative to each other. Each scissor-linkage includes a pair of links interconnected to each other about midlength. One link of each scissor-linkage is pivotally connected toward one end to the base frame. The other link of each scissor-linkage is pivotally connected toward one end to the table of the lifting apparatus.

The end of each link opposite from its pivotal connection to the table or base frame is provided with a roller. As will be appreciated, the provision of a roller significant reduces frictional surface contact between the link and the table or base frame. To limit vertical displacement of the table relative to the base frame, at least one of the rollers of the linkage assembly is captured by gib structure. As known, and while limiting vertical displacement of the table relative to the base frame, such gib structure furthermore interferes with standard and usually daily maintenance by inhibiting access to the rollers of the linkage assembly.

In a preferred form of the invention, the maintenance problems involving access to the rollers of the linkage assembly are addressed by redesigning the gib structure. More specifically, in a preferred form of the invention, the gib structure includes a plate releasably attached to the remainder of the gib structure. The plate is attached to the gib structure such that the plate can be readily and easily removed from operable association with the roller engaged thereby, thus, promoting service access to the roller arranged in operable association with the plate as required during operation of the lifting apparatus.

According to one aspect of the invention, the gib structure is arranged in operable combination with at least one of the side members of the base frame. More specifically, the removable plate of the gib structure combines with at least one of the side members of the base frame to define an elongated channel within which one of the rollers of the linkage assembly rides and reciprocally moves in response to vertical movements of the table relative to the base frame. In another preferred form, the gib structure is arranged in operable combination with both side members of the base frame. In this preferred form, the removable plate of each gib structure combines with an operably associated side member of the base frame to define elongated channels within which rollers of the linkage assembly reciprocally move in response to elevation of the table relative to the base frame. After the plate is removed from operable association with the remaining gib structure, the pneumatic actuator is operated thereby allowing the rollers of the linkage assembly to be removed from the channel in which they reciprocally slide so as to enhance service access thereto.

In view of the above, a primary object of this invention is to provide a lifting apparatus with structural integrity as to allow the lifting apparatus to be portably moved between location as required by the user thereof and under the influence of a moving device, thus, adding to the versatility and usefulness of the lifting apparatus.

Another object of the present invention is to provide a base frame of a lifting apparatus with a suitable opening for accommodating a conventional moving device, thus, promoting portability of the lifting apparatus of the present invention.

Another object of the present invention is to design and provide a lifting apparatus utilizing a pneumatically operated actuator including an air bag operably sealed between top and bottom plates and wherein the bottom plate of the pneumatically operated actuator is releasably fastened to a base frame of the lifting apparatus at a distance elevated from the support surface for such lifting apparatus so as to facilitate and enhance access to the fasteners used to releasably secure the bottom plate to the base frame.

Still another object of this invention is to provide a lifting apparatus which embodies a linkage assembly whose vertical limit is controlled by gib structure and wherein such gib structure includes a removable structure allowing an operably associated roller of the linkage assembly to be easily and readily removed from the gib structure when service access is required thereto.

These and other objects, aims and advantages of the present invention will become more readily appreciated and apparent from the following detailed description, drawings and the appended claims.

DETAILED DESCRIPTION OF THE DRAWINGS

DETAILED DESCRIPTION OF THE PRESENT INVENTION

Figure 1:
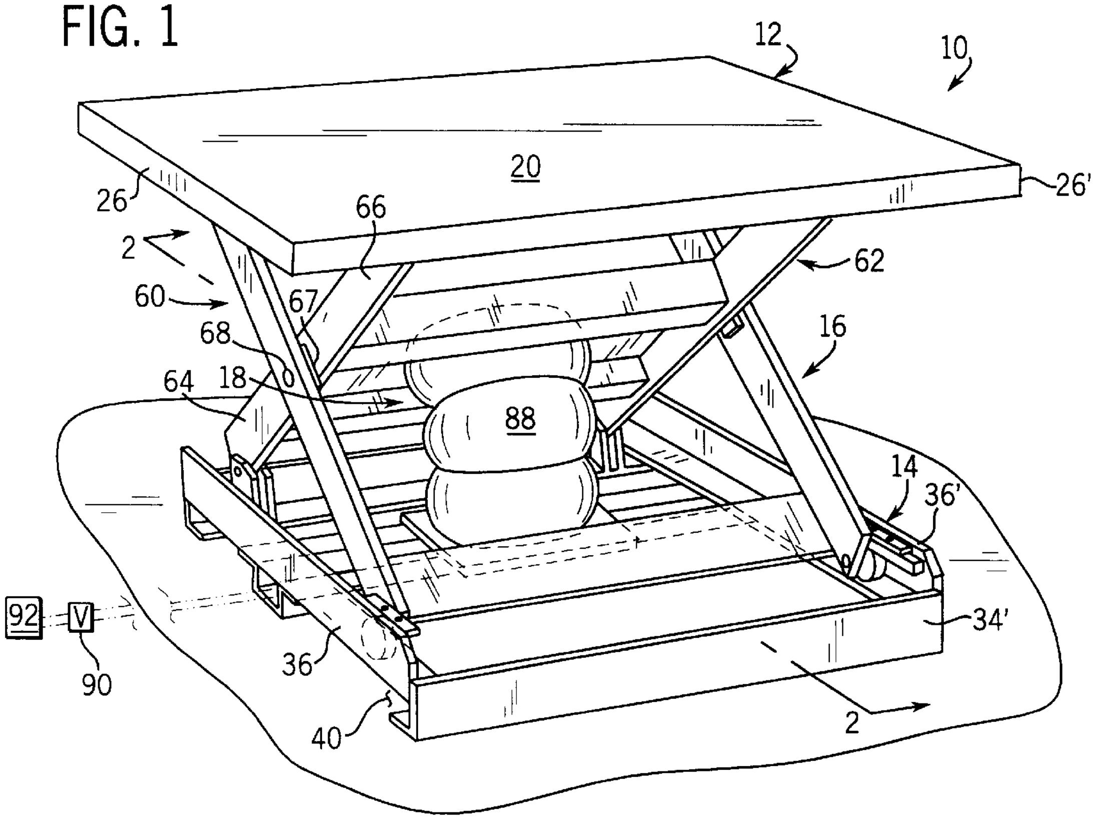
FIG. 1 is a perspective view of a portable lifting apparatus according to the present invention illustrated in a raised position.

While the present invention is susceptible of embodiment in various forms, there is shown in the drawings and will hereinafter be described in detail a preferred embodiment of the invention with the understanding the present disclosure is intended to set forth an exemplary embodiment of the invention which is not intended to limit the invention to the specific embodiment illustrated.

Referring now to the drawings, wherein like reference numerals indicate like parts throughout the several views, a portable lifting apparatus according to the present invention, and generally identified by reference numeral 10, is illustrated in FIG. 1. As illustrated, the lifting apparatus 10 includes a support table 12, a base frame 14 disposed beneath the table 12, a linkage assembly 16 for maintaining the table 12 and base frame 14 in generally parallel relationship relative to each other as the table 12 elevationally moves between raised and lowered positions, and a pneumatically operated actuator 18 for moving the table 12 between the raised and lowered positions.

Figure 2:
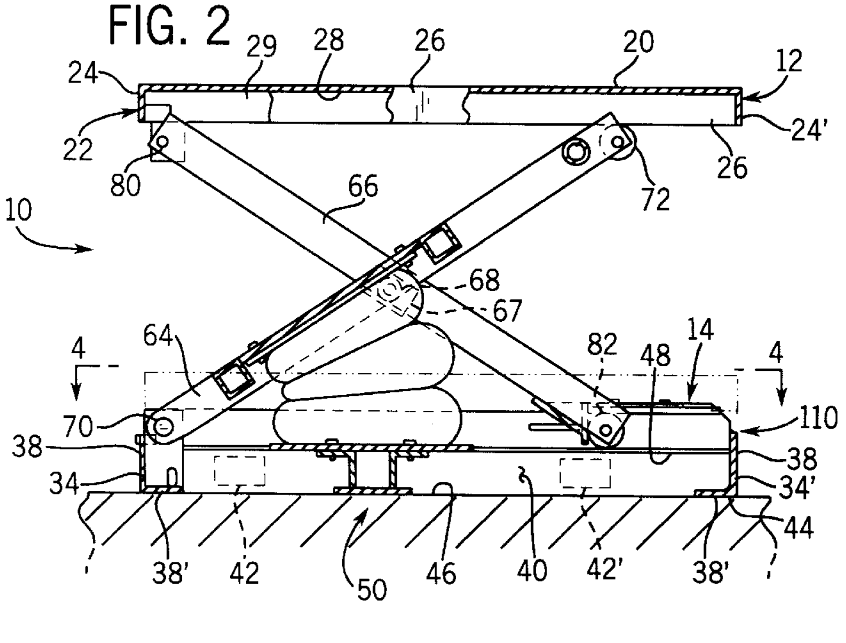
FIG. 2 is a longitudinal sectional view of the portable lifting apparatus taken along line 2—2 of FIG. 1.

Turning to FIG. 2, the support table 12 is typically fabricated from a suitable metal material such as steel and includes an upper support surface 20 on which work articles are supportably positioned. In a preferred form, support surface 20 has a generally planar configuration and a skirt structure 22 depending from surface 20 to add strength and rigidity to the table 12. In the illustrated form, the skirt structure 22 includes a pair of parallel and spaced depending end walls 24 and 24' and a pair of parallel and spaced depending side walls 26 and 26'. Support table 12 further includes an undersurface 28 beneath the support surface 20. The undersurface 28 on table 12 includes a pair of laterally spaced rails 29 which add strength and rigidity to the support surface 20 of table 12. In the illustrated embodiment, the rails 29 extend generally parallel to each other and generally parallel to the side walls 26 and 26' of the skirt structure 22.

Figure 3:
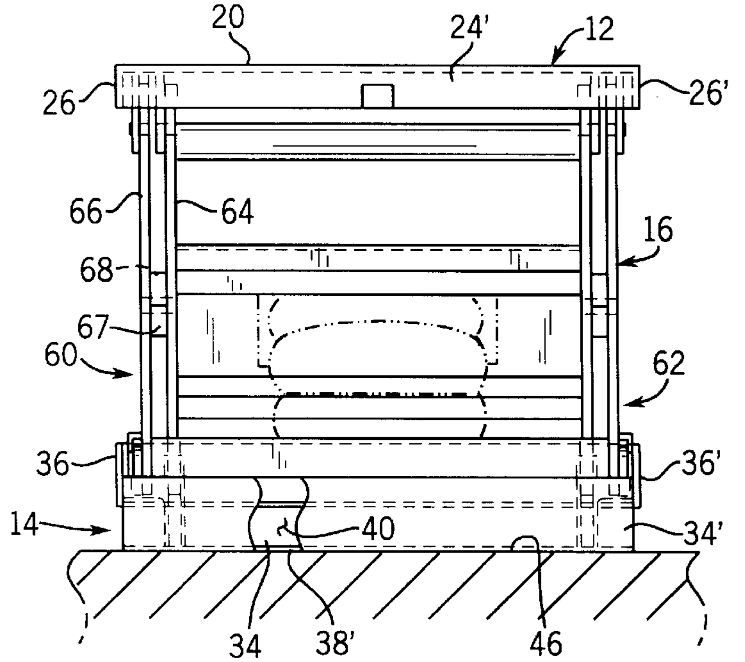
FIG. 3 is an end view of the portable lifting apparatus illustrated in FIG. 2.

As illustrated in FIGS. 2 and 3, the base frame 14 of the lifting apparatus 10 is disposed beneath the support surface 20 of the table 12 and has a generally rectangular configuration. In the illustrated form, the base frame 14 includes a pair of rigid elongated and spaced end members 34 and 34' rigidly interconnected to a pair of rigid elongated and spaced side members 36 and 36'. In the exemplary form, the end members 34, 34' of the base frame 14 extend generally parallel to each other and generally parallel relative to the end walls 24, 24' of the table 12. Moreover, in the exemplary form, the side members 36, 36' of the base frame 14 extend generally parallel to each other and generally parallel to the side walls 26, 26' of the table 12.

To add strength and rigidity to the base frame 14, each end member 34, 34' and each side member 36, 36' has a generally L-shaped cross-sectional configuration. That is, in the exemplary embodiment, the cross-sectional configuration of each end member 34, 34' and each side member 36, 36' includes an elongated leg portion 38 joined to a shorter leg portion 38'. When the base frame 14 is assembled, the longer leg portion 38 of each end member 34, 34' and each side member 36, 36' is arranged in a generally vertical disposition to add structural rigidity to the base frame 14.

As mentioned above, a salient feature of the lifting apparatus 10 of the present invention relates to the ability to transport the lifting apparatus between locations thereby adding to the versatility of the invention. In the illustrated form, and as shown in FIGS. 1 through 3, the base frame 14 defines an opening 40 for accommodating spaced tines 42, 42' (FIG. 2) of a conventional moving device such as a conventional fork lift or pallet jack. Notably, the opening 40 defined by the base frame 14 extends completely through the base frame 14 so as to not interfere with proper transporting of the lifting apparatus 10 as through use of a conventional moving device.

In a preferred form of the invention, and as illustrated in FIGS. 2 and 3, the pair of end members 34, 34' and the pair of side members 36, 36' of the base frame 14 are rigidly interconnected in vertically spaced relation relative to each other. That is, one pair or set of parallel members of the base frame 14 is affixed in vertically spaced relation relative to the other pair or set of parallel members of the base frame 14. In the illustrated form of the invention, the side members 36, 36' are arranged in vertically elevated relation relative to the end members 34, 34'.

As illustrated in FIG. 2, when the base frame 14 is assembled, the leg portions 38' of both end members 34 and 34' are preferably assembled in generally planar relation relative to each other and combine with each other to define a planar surface 44 for engaging that surface 46 on which the lifting apparatus 10 of the present invention is to be disposed during operation. As such, and with the side members 36, 36' being secured in elevationally spaced relation relative to the end members 34, 34', the leg portions 38' of both side members 36, 36' are vertically spaced above the support surface 46 on which the lifting apparatus 10 of the present invention is disposed to define an upper limit for the opening 40 passing through the base frame 14. Preferably, the leg portions 38' of both side members 36, 36' combine with each other to define a planar surface 48 engagable by tines 42, 42' of the conventional moving device when the lifting apparatus 10 is removed from the surface 46.

Of course, and without departing from the spirit and scope of the present invention, it is also possible to configure the base frame 14 such that the side members 36, 36' are arranged in generally planar relation relative to each other and are disposed on the base frame 14 so as to engage the ground or support surface 46 while the end members 34, 34' are arranged in elevated relation relative thereto. As such, the leg portions 38' of the side members 36, 36' would define the surface 44 used to support the lifting apparatus 10 on surface 46 while the leg portions 38' of the end member 34, 34' would define the upper limit of the opening 40 accommodating the tines 42, 42' of the moving device.

Figure 4:
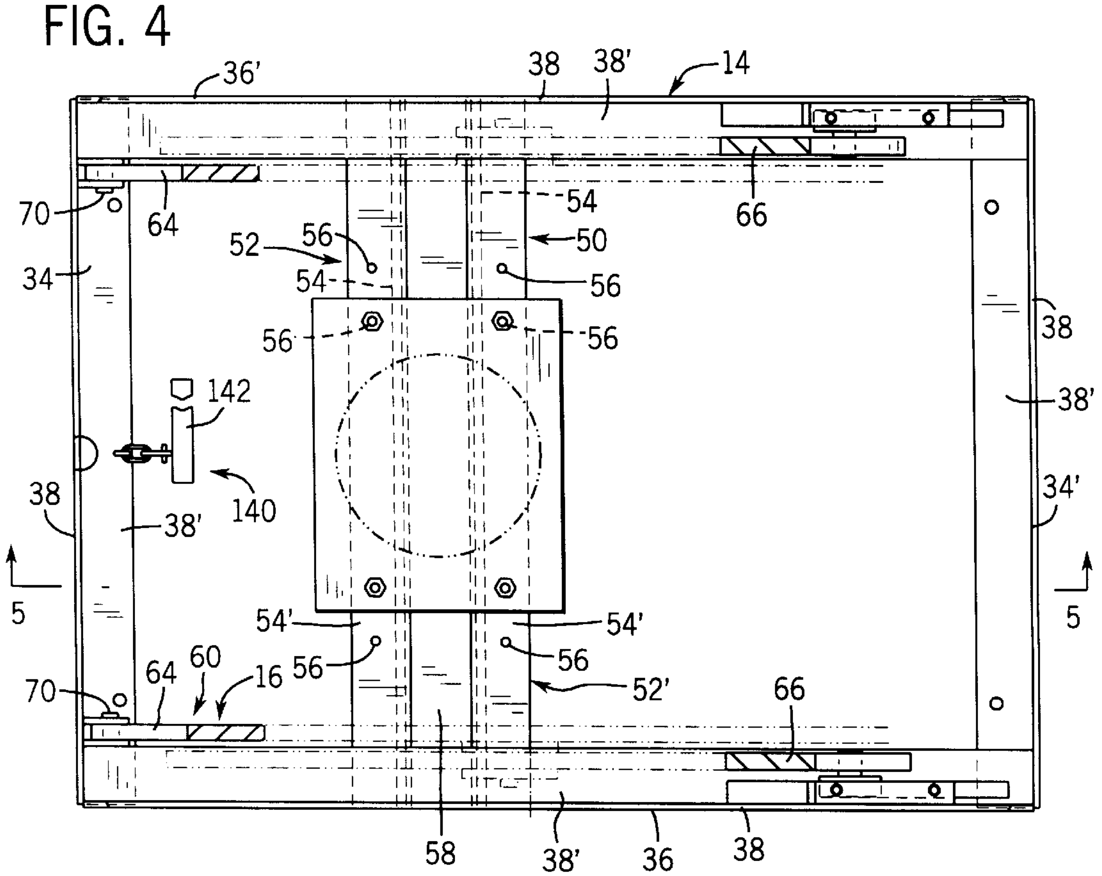
FIG. 4 is a sectional view taken along line 4—4 of FIG. 2.
Figure 5:
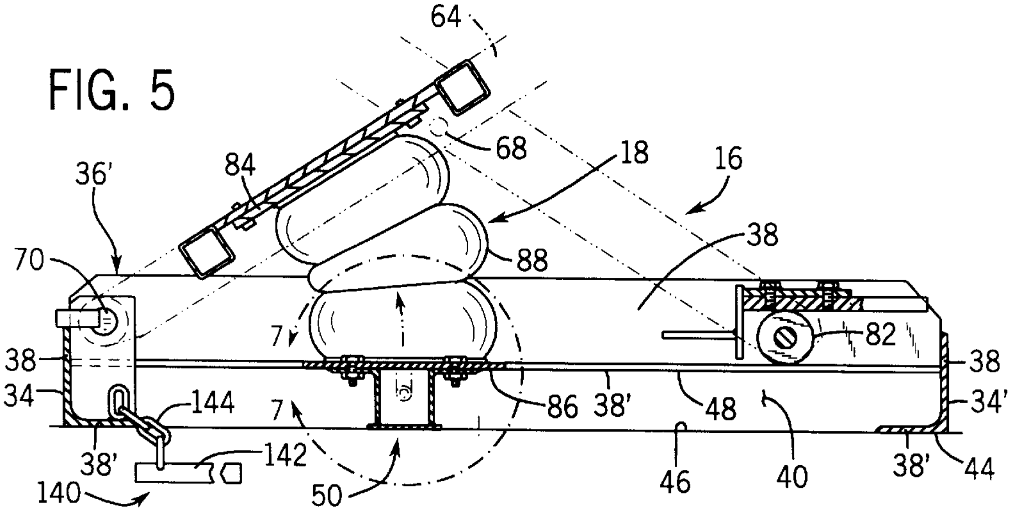
FIG. 5 is a sectional view taken along line 5—5 of FIG. 4.

As illustrated in FIGS. 2, 4 and 5, the base frame 14 can further include an additional elongated support member 50 for adding strength and rigidity to the base frame 14. In the illustrated form of the invention, the elongated support member 50 is disposed between and extends generally parallel to the end members 34, 34'. In the illustrated form of the invention, the support member 50 is rigidly connected toward opposite ends to the leg portion 38' of the elevated pair of side members 36, 36' of the base frame 14 and serves to divide opening 40 into two smaller openings arranged on opposite sides of the support member 50.

Figure 7:
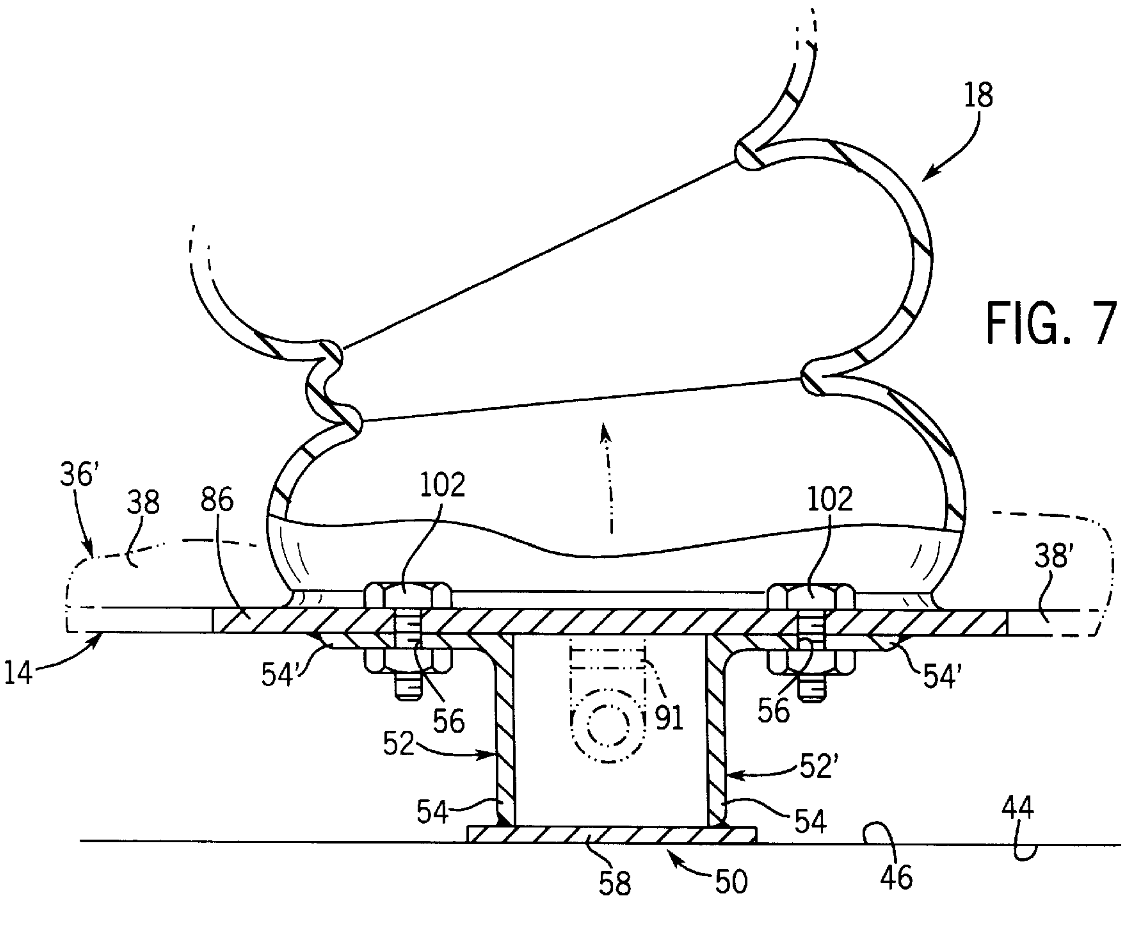
FIG. 7 is an enlarged sectional view of that area encircled in FIG. 5.

In the form illustrated in FIGS. 4 and 7 for exemplary purposes, the support member 50 includes a pair of rigid elongated and spaced members 52 and 52', each extending generally parallel to the end members 34, 34' of the base frame 14. Each elongated member 52, 52' preferably has an angled configuration including angularly connected leg portions 54, and 54'. When the support member 50 is arranged in operable combination with the base frame 14, leg portion 54 of each member 52, 52' is generally vertically disposed while leg portion 54' of each member 52, 52' is generally horizontally disposed in vertically elevated or spaced relation from the planar surface 44 defined by the ground engaging pairs of members of the base frame 14. In the illustrated embodiment, the generally horizontal disposition of the leg portion 54' facilitates attachment of each member 52, 52', as by welding or the like, to the leg portion 38' of the side members 36, 36'.

Figure 6:
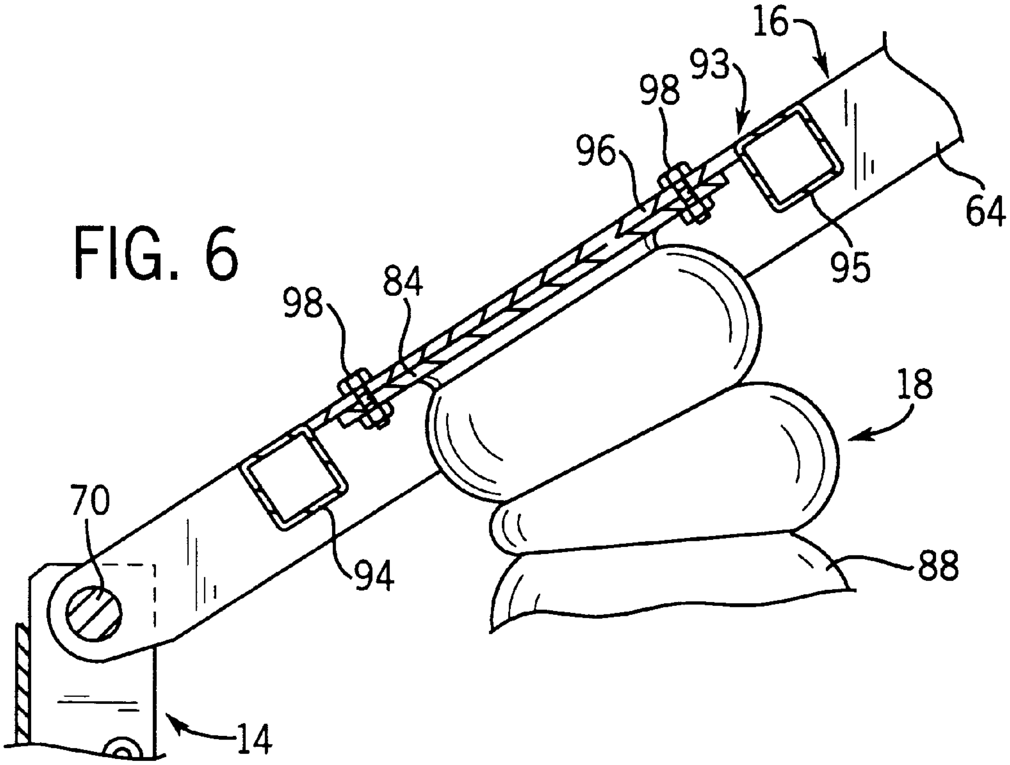
FIG. 6 is an enlarged view of that portion of a linkage assembly whereat an air spring assembly is releasably attached thereto.

As illustrated in FIGS. 4 and 6, and for purposes described in detail below, the horizontal leg portion 54' of each elongated member 52, 52' of member 50 defines a series of axially spaced apertures or throughbores 56. In most preferred form of the invention, the throughbores 56 defined by the horizontal leg portion 54' of member 52 are generally laterally aligned with the throughbores 56 defined by the horizontal leg portion 54' of member 52'. Moreover, the free ends of the leg portions 54 of the elongated members 52, 52' are rigidly joined to each other by a plate 58 having a lower surface extending substantially coplanar with the surface 44 defined by the ground engaging pairs of members of the base frame 14.

In the illustrated embodiment, and as illustrated in FIGS. 3, 4 and 5, the linkage assembly 16 for the lift apparatus 10 of the present invention preferably includes a pair of scissor-like linkages 60 and 62 for interconnecting the support table 12 with the base frame 14 and for maintaining the support table 12 in generally parallel relation relative to the base frame 14 between raised and lowered positions. In a preferred embodiment, the scissor-like linkages 60 and 62 are arranged in generally parallel relation relative to each other. In a most preferred form of the invention, the scissor-like linkages 60 and 62 extend generally parallel to the side members 36, 36' of the base frame 14.

Preferably, the scissor-like linkages 60, 62 are substantially similar to each other. Accordingly, only scissor-like linkage 60 will be discussed in detail with the understanding that linkage 62 is substantially similar in construction. Each scissor-like, linkage 60, 62 includes pairs of elongated links or members 64 and 66 which are pinned together as at 68 proximate their midlength. The links or members 64, 66 are of a strong metal or alloy, e.g., aluminum alloy and are secured in parallel relationship relative to each other by a rigid transverse portion 67 disposed adjacent and to opposite sides of the pivot 68.

As illustrated in FIGS. 4 and 5, the link or member 64 of each scissor-like linkage 60, 62 is pivotally secured as at 70 toward one end to the base frame 14 in a conventional fashion. As illustrated in FIG. 2, the other end of the link or member 64 of each scissor-like linkage 60 is provided with a conventional roller 72 which operably engages and freely rolls along an underside of one of the rails 29 on the support table 12.

As illustrated in FIG. 2, the link or member 66 of each scissor-like linkage 60, 62 is pivotally secured as at 80 toward one end to the support table 12 in a conventional fashion. When the lifting apparatus 10 of the present invention is assembled, the pivot location 80, whereat the link or member 66 of each scissor-like linkage 60, 62 articulately connects to the table 12, is above and in general alignment with the pivot location 70, whereat the link or member 64 of each scissor-like linkage 60, 62 articulately connects to the base frame 14. As illustrated in FIG. 2, the other end of the link or member 66 of each scissor-like linkage 60, 62 is provided with a conventional free turning lubricated roller 82 which operably engages and rolls along the base frame 14 in a manner described in further detail below so that operation of the linkage assembly 16 raises and lowers the table 12 in generally parallel relation relative to the base frame 14 in response to operation of the pneumatically operated driver or actuator 18.

Preferably, the pneumatically or fluid operated actuator 18 is a commercially available assembly sold by Firestone Corporation. In the exemplary embodiment illustrated in FIG. 5, the actuator 18 includes a top plate 84 releasably secured to and between links 64 of each linkage assembly 60, 62, a bottom plate 86, and an air bag or bellows 88 which expands and retracts as a function of fluid volume therewithin. As schematically represented in FIG. 1, a suitable manually controlled valve 90 is interposed between a source of fluid pressure 92 and the air bag or bellows 88 for controlling the vertical disposition of the table 12 relative to the base frame 14. In a most preferred form of the invention, the pneumatic driver 18 further includes a relief valve 91 (FIG. 7) for protecting against over inflation of the air bag or bellow 88. As will be appreciated by those skilled in the art, a source of pressurized air is typically provided in most work environments wherein a lifting apparatus of the type according to the present invention is utilized. As is typical, the air bag or bellows 88 is operably connected and sealed to the top and bottom plates 84 and 86, respectively. Moreover, and although only one air bag or bellows 88 is illustrated for exemplary purposes, it should be appreciated that more than one air bag or bellows can be used without detracting or departing from the spirit and scope of the present invention.

Turning to FIG. 6, and to add further strength and rigidity to the lifting apparatus of the present invention, the linkage assembly 16 preferably includes an intermediate support structure 93 preferably disposed between the pivot 70, whereat the links 64 of each linkage 60, 62 are articulately joined to the base frame 14, and the roller 72 (FIG. 2) arranged toward an opposite end of each link 64 of linkage assembly 16. In a preferred form, such support structure 93 includes spaced cross-members 94 and 95 extending between the links 64 of each scissor-like linkage 60, 62 and an apertured plate 96 spanning the distance between and secured to the spaced cross-members 94 and 95.

In a preferred form, and as illustrated in FIG. 6, the top plate 84 of the fluid operated apparatus 18 is releasably secured to the support structure 93 as with suitable fasteners 98. As will be appreciated, the releasable fasteners 98 can take any suitable form. For example, fasteners 98 can include suitable bolt and nut fasteners which pass through the top plate 84 and the apertured plate 96 of the support structure 93 to releasably secure the top plate 84 of the fluid operated apparatus 18 to the linkage assembly 16. Of course, other equivalent fastener types could likewise be used for releasably securing the top plate 84 of the fluid operated apparatus 18 to the support structure 93 without detracting or departing from the spirit and scope of the present invention. Moreover, additional or derivative designs for the support structure 93 would equally suffice for that shown for exemplary purposes without detracting or departing from the spirit and scope of the present invention. Suffice it to say, the top plate 84 of the fluid operated apparatus 18 is releasably secured to the linkage assembly 16 in a manner permitting readily access to the fasteners 98 used to effect such releasable securement.

As mentioned above, another salient feature of the present invention involves releasably securing the bottom plate 86 of the fluid operated apparatus 18 to the base frame 14 in elevated relation from that surface 46 on which the base frame 14 of the lifting apparatus 10 rests during operation of the lifting apparatus 10. As illustrated in FIG. 7, the bottom plate 86 of the fluid operated apparatus 18 is releasably fastened to the elongated support member 50 of the base frame 14 in elevated relation from that surface 46 on which the base frame 14 of the lifting apparatus 10 rests during operation of the lifting apparatus 10.

In a preferred form, the bottom plate 86 of the fluid operated apparatus 18 is positioned above the generally horizontally disposed leg portions 54' of the spaced members 52, 52 forming the support member 50. In the preferred form, the bottom plate 86 of the fluid operated apparatus 18 is releasably secured to the support 50 as with suitable fasteners 102. As will be appreciated, the releasable fasteners 102 can take any suitable form. For example, fasteners 102 can include suitable bolt and nut fasteners which pass through the bottom plate 86 of the fluid operated apparatus 18 and the apertures 56 defined by the leg portions 54' of the support 50 to releasably secure the bottom plate 86 of the fluid operated apparatus 18 to the base frame 14. Of course, other equivalent fastener types could likewise be used for releasably securing the bottom plate 86 of the fluid operated apparatus 18 to the base frame 14 without detracting or departing from the spirit and scope of the present invention. Suffice it to say, a unique feature of the present invention relates to having the base frame 14 and bottom plate 86 combine with each other to elevate the bottom plate fasteners 102 from that surface 46 on which the lifting apparatus 10 is positioned thereby promoting access to the fasteners 102 securing the bottom plate 86 of the fluid operated apparatus 18 to the base frame 14 and thereby significantly reducing the amount of time required to effect repair and/or replacement of the pneumatically operated actuator 18.

Figure 8:
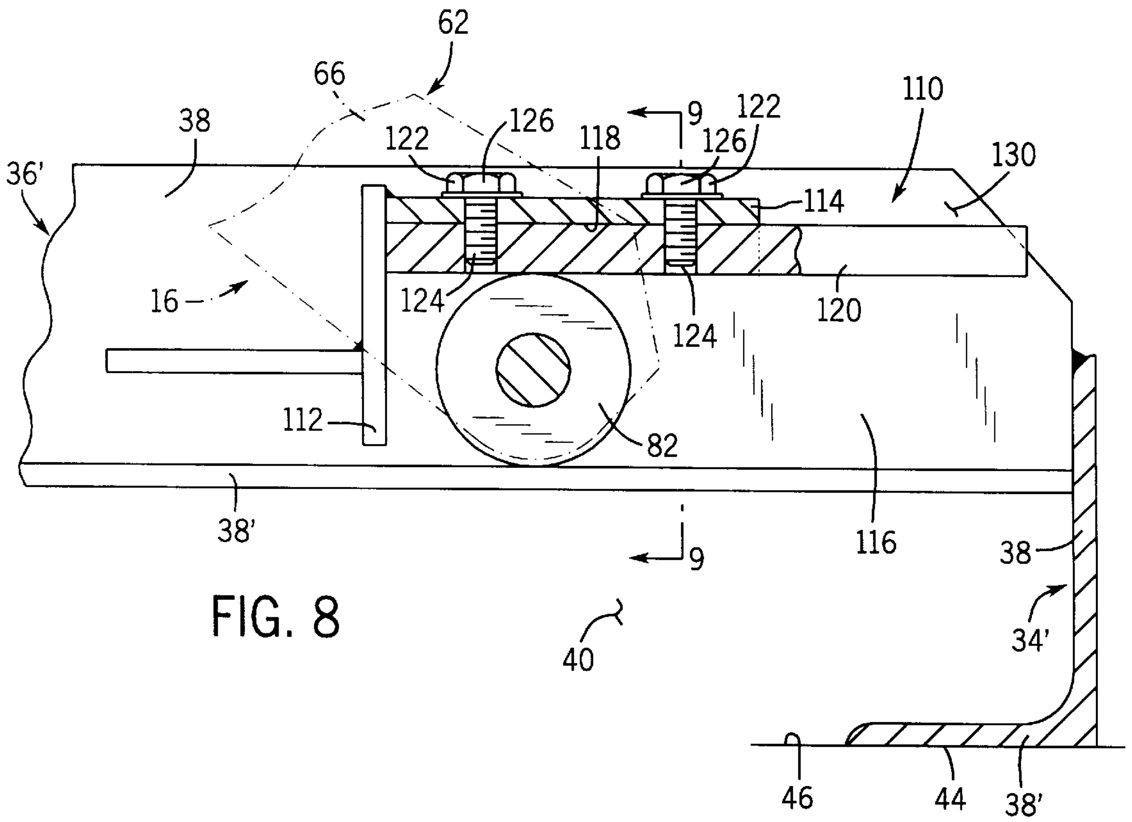
FIG. 8 is an enlarged view of a gib structure forming part of the present invention.
Figure 9:
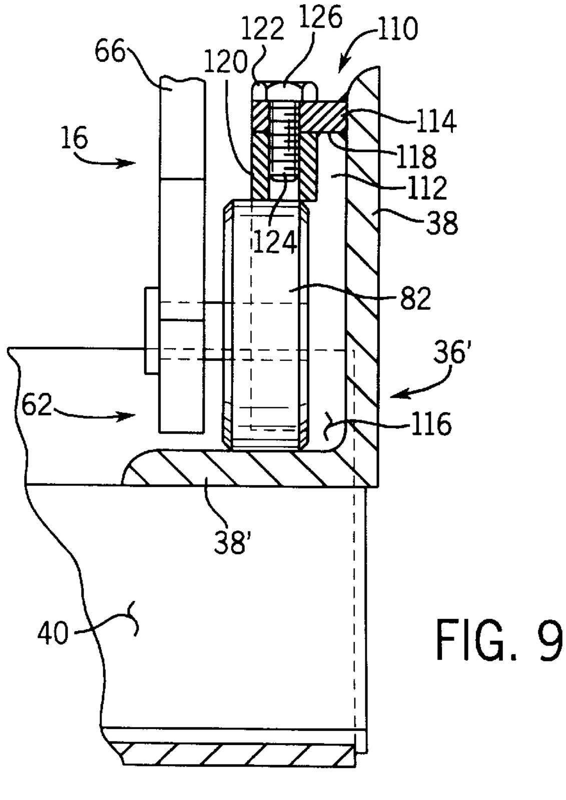
FIG. 9 is a sectional view taken along line 9—9 of FIG. 8.

Turning to FIGS. 8 and 9, the base frame 14 of the lifting apparatus of the present invention is furthermore provided with gib structure 110 wherein the rollers 82 of the linkage assembly 16 are accommodated for rolling movement along a fixed path of travel. As will be appreciated from an understanding of the present invention, the purpose of the gib structure 110 is to limit the upward travel of the table 12 (FIG. 2). Additionally, and in the preferred embodiment, the gib structure 110 promotes expansion of the linkage assembly 16 upon energization of the pneumatically operated actuator 18.

Gib structure 110 is arranged in operable combination with at least one of the base frame members extending generally parallel with the linkages 60, 62 of the linkage assembly 16. In a preferred form, the gib structure 110 is arranged in operable combination with at least one of the side members 36 of the base frame 14. In a most preferred form, the gib structure 110 is arranged in operable combination with both members 36, 36' of the base frame 14. When arranged in operable combination with both side members 36, 36' of the base frame 14, the gib structure 110 is essentially the same configuration. Accordingly, only the gib structure associated with side member 36' of the base frame 14 will be discussed in detail with the understanding the other gib structure is essentially of the same construction.

As illustrated in FIGS. 8 and 9, gib structure 110 is arranged in operable combination with the respective side member of the base frame 14 and is arranged toward that end of the side member adjacent end member 34'. As illustrated, the roller 82 associated with the free end of the link 66 of each linkage 60, 62 rides or rolls along an upper surface of the generally horizontally disposed leg portion 38' of the respective side member of the base frame. Gib structure 110 includes a generally vertical projection 112 extending generally normal to and away from the generally vertically disposed leg portion 38 of the respective side wall and into the path of travel of the roller 82. As such, projection 112 limits the travel of the roller 82 in one direction of travel and effectively controls the upper travel limit for the table 12. At the other end of travel of the roller 82, the generally vertical web or leg 38 of the end member 34' limits the travel of the roller 82.

Gib structure 110 further includes a generally horizontally disposed element 114 disposed above the roller 82. In the illustrated form, element 114 extends away from projection 112 toward the end wall 34' and horizontally away from and generally normal to the generally vertically disposed leg or web portion 38 of the respective side member of the base frame 14. In effect, the end wall 34', along with the horizontal leg portion 38' of the respective side member, in combination with the projection 112 and element 114 define an open sided channel 116 within which the roller 82 travels during elevational movement of the table 12. Notably, the horizontally disposed element 114 of gib structure 110 is specifically designed to extend horizontally over the roller 82 for only a portion of the travel of roller 82.

Still another salient aspect of the invention, relates to providing enhanced service access to the rollers 82 of the linkage assembly 16. In this regard, gib structure 110 is provided with a removable plate 120 arranged in operable combination with element 114. As illustrated in FIG. 8, the plate 120 extends beyond the free end of element 114 toward the end wall 34'. In the illustrated form, plate 120 has a thickness equal to the distance separating the outer diameter of the roller 82 from the undersurface 118 of element 114. As such, the roller 82 is confined to strictly horizontal movement within the channel 116.

In the illustrated form, and as shown in FIGS. 8 and 9, plate 120 is releasably connected or secured to element 114 as through one or more releasable fasteners 122. In the illustrated embodiment, the fasteners 122 include threaded bolts 124. Suffice it to say, each bolt 124 has a head portion 126 which is readily accessible to facilitate attachment and reattachment of the plate 120 to element 114. Of course, fasteners other than that shown for exemplary purposes can equally suffice to releasably secure plate 120 to element 114 without detracting or departing from the spirit and scope of the present invention.

As will be appreciated from a review of FIG. 8, after plate 120 of gib structure 110 is removed from operable association with element 114, a void or opening 130 is defined between the free end of element 114 and the base frame 14. As such, the roller 82 of linkage assembly 16 is permitted to freely pass therebetween, preferably, in response to expansion of the pneumatic driver 18. Readily permitting passage or removal of the roller 82 of linkage assembly 16 from the channel 116 allows the roller 82 to be lifted from operable association with the gib structure 110 in a manner readily enhancing service access thereto.

In a most preferred form, the lifting apparatus 10 of the invention further includes structure 140 (FIGS. 4 AND 5) for maintaining the table 12 in an elevated or raised position during service or maintenance thereof In the illustrated embodiment, structure 140 preferably includes an elongated rigid bar 142 which can be elevationally positioned between the table 12 and the base frame 14 of the lifting apparatus 10 thereby releasably securing or locking the table 12 in an elevated or fully raised position for maintenance or service. As will be appreciated, the operable length of the bar 142 is such that the table 12 is maintained in an elevated position when the bar 142 extends generally upright between the leg portion 38' of end member 34 and the table 12 regardless of the energized state of the pneumatically operated driver or actuator 18. In a most preferred form, bar 142 is fastened to the base frame 14 as through a chain 144 or other suitable attachment means allowing for the bar 142 to be moved as required while maintaining a connection with the base frame 14 so as to inhibit inadvertent loss of such structure 140.

The design of the present invention described in detail above provides several unique advantages over heretofore known lifting devices. For example, the lifting apparatus 10 of the present invention has structural rigidity which allows the apparatus 10 to operate without having to secure the base frame 14 to the floor or other support surface 46 on which the apparatus 10 is to be positioned and operated. Additionally, the base frame 14 of the present invention defines one or more openings 40 suitable for allowing tines 42 of a conventional moving device to be inserted therethrough whereby allowing the apparatus 10 to be transported between locations. As will be readily appreciated, the portability of the present invention, as compared to other heretofore units which were required to be bolted in place, lends heretofore unknown versatility to such a lifting apparatus.

As mentioned above, prior lifting devices permitted access to the fasteners 85 commonly used to secure the pneumatic driver 18 to the base frame 14. The design of the lifting apparatus 10 of the present invention, however, has been significantly enhanced by yielding ready access to the fasteners 102 used to secure a lower end of the pneumatic driver 18 to the base frame 14. With the present invention, the fasteners 102 used to releasably secure the lower end of the pneumatic driver 18 to the base frame 14 are elevated above that surface 46 on which the lifting apparatus 10 is operationally positioned. The elevational distance separating the fasteners 102 used to secure the lower end of the pneumatic driver 18 to the base frame 14 from the support surface 46 provides heretofore unknown access to such fasteners thereby simplifying maintenance and repair of the fluid operated actuator or driver 18. Moreover, the elevational distance separating the fasteners 102 used to secure the lower end of the pneumatic driver 18 to the base frame 14 from the support surface 46 maintains those fasteners 102 away from direct contact with elements and environments which could, ultimately, cause or result in deterioration of the fasteners 102. As will be appreciated, inhibiting deterioration, i.e., rusting of the fasteners 102, will only advantageously facilitate replacement or repairing of the pneumatic driver 18 when required.

Service access to components of the lifting apparatus 10 was also an important consideration when configuring the gib structure 1 10. As will be appreciated by those skilled in the art, significant forces can be applied to the rollers 82 of the linkage assembly 16 during operation of the lifting apparatus 10. Those significant forces frequently require repair and/or replacement of the rollers 82. Access to rollers 82 purposefully entrapped within a channel 116, however, causes significant trouble during service. With the present invention, however, the gib structure 110 is provided with structure to facilitate access to such rollers 82. As discussed above, removal of the plate 120 from operable association with the gib structure 110 readily permits the roller 82 to be removed from the channel 116 thereby yielding service access thereto. Advantageously, the roller 82 can be readily reinserted into the channel 116 and the plate 120 reattached as with the fasteners 122 thereby significantly reducing the time period it takes to perform service on such rollers. Of course, reduced service time readily translates into more time for the lifting apparatus 10 of the present invention to be put to operational efforts.

From the foregoing it will be observed that numerous modification and variations can be effected without departing or detracting from the true spirit and the novel concept of the present invention. It will be appreciated that the present disclosure is intended to set forth exemplifications of the invention which are not intended to limit the invention to the specific embodiments illustrated. The disclosure is intended to cover by the appended claims all such modifications and variations as fall within the spirit and scope of the claims.

What is claimed is:

1. A portable lifting apparatus, comprising:

a table defining a support surface;

a rigid base frame disposed beneath the support surface of said table, said base frame including a pair of rigid elongated and spaced end members disposed in generally parallel relation relative to each other and a pair of rigid elongated and spaced side members disposed in generally parallel relation relative to each other, with said end members and side members being rigidly interconnected in vertically spaced relation relative to each other, and wherein one pair of said members defines a surface for engaging a surface on which said lifting apparatus is to be disposed, and wherein the vertical spacing between said pairs of members defines an opening for accommodating laterally spaced tines of a mobile device whereby allowing said lifting apparatus to be moved between locations as required by the user thereof;

a linkage assembly for maintaining the support surface of said table and said base in generally parallel relation relative to each other as said table moves between raised and lowered positions; and an actuator for moving said table between said raised and lowered positions.

2. The portable lifting apparatus according to claim 1 wherein said base frame further includes an elongated support member disposed between and rigidly connected toward opposite ends to that pair of members elevated above that pair of members defining the planar surface which engages that surface on which said lifting apparatus is to be disposed.

3. The portable lifting apparatus according to claim 1 wherein each end member and each side member has a generally L-shaped configuration, with a longer leg of each L-shaped member being secured to each other and is disposed in a generally vertical orientation when said base frame is assembled thereby adding strength and structural rigidity to the portable lifting apparatus.

4. The portable lifting apparatus according to claim 1 wherein said linkage assembly includes a pair of scissor-linkages, each scissor-linkage including a pair of links interconnected to each other about midlength, with one link of each scissor-linkage being pivotally connected toward one end to said base frame, and with the other link of each scissor-linkage being pivotally connected toward one end to said table.

5. The portable lifting apparatus according to claim 1 wherein said actuator includes at least one expandable and retractable fluid operated apparatus.

6. A lifting apparatus, comprising:

a table having a generally planar upper support surface and an undersurface beneath said upper surface;

a rigid base frame disposed beneath the upper support surface of said table, said base frame including a series of rigid interconnected members defining a support surface for said lifting apparatus;

a linkage assembly for maintaining the upper surface of said table and the support surface of said base frame in generally parallel relation relative to each other as said table moves between raised and lowered positions;

a fluid operated apparatus for moving said table between said raised and lowered positions, said fluid operated apparatus including a pneumatic actuator including a top plate releasably secured to said linkage assembly, a bottom plate, and an air bag which expands and retracts as a function of fluid volume therewithin, with said air bag being operably connected and sealed to said top and bottom plates, and wherein said bottom plate is releasably secured with fasteners to the base frame at a distance elevated from said support surface to facilitate access to said fasteners used to releasably secure the bottom plate to the base frame.

7. The lifting apparatus according to claim 6 wherein said base frame includes a pair of elongated rigid spaced end members disposed in generally parallel relation relative to each other and a pair of rigid and generally parallel side members, with said end members and said side members being rigidly interconnected in generally vertical relation relative to each other.

8. The lifting apparatus according to claim 7 wherein said base frame further includes an elongated rigid support member disposed between and rigidly connected toward opposite ends to that pair of members disposed above the other pair of members, and wherein said bottom plate of said pneumatic actuator is releasably connected intermediate opposed ends of said rigid support member.

9. The lifting apparatus according to claim 7 wherein said bottom plate of said pneumatic actuator is connected between that pair of members elevationally disposed above said other pair of members.

10. The lifting apparatus according to claim 6 wherein said linkage assembly includes a pair of scissor-linkages disposed in generally parallel relationship relative to each other, each scissor-linkage including a pair of links interconnected to each other about midlength, with one link of each scissor-linkage being pivotally connected toward one end to said base frame, and with the other link of each scissor-linkage being pivotally connected toward one end to said table.

11. A lifting apparatus, comprising:

a table defining a support surface;

a rigid base frame disposed beneath the support surface of said table, said base including a pair of rigid elongated and spaced end members disposed in generally parallel relation relative to each other and a pair of rigid elongated and spaced side members disposed in generally parallel relation relative to each other, with said end members and side members being rigidly interconnected in vertically spaced relation relative to each other, and wherein one pair of said members defines a planar surface which engages a surface on which said lifting apparatus is to be disposed, and wherein the vertical spacing between said pairs of members defines an opening for accommodating laterally spaced tines of a mobile device used to move said lifting apparatus between locations;

a linkage assembly for maintaining the support surface of said table and said base in generally parallel relation relative to each other as said table moves between raised and lowered positions, said linkage assembly including a pair of scissor-linkages disposed in generally parallel relationship relative to each other and with said side members of said frame, each scissor-linkage including a pair of links interconnected to each other about midlength, with one link of each scissor-linkage being pivotally connected toward one end to said base frame, and with the other link of each scissor-linkage being pivotally connected toward one end to said table, and wherein the end of each link opposed from that link end pivotally connected to the base frame or table includes a roller for reducing frictional surface contact between the links and said base frame and said table;

an actuator for moving said table between said raised and lowered positions; and gib structure for limiting vertical displacement of said table relative to said base frame, said gib structure including a plate engagable with at least one of said rollers, and wherein said plate is releasably attached to such gib structure to permit said plate to be removed from operable association with that roller with which the plate is engaged thereby enhancing service access to the roller arranged in operable association with the plate as required during operation of said lifting apparatus.

12. The lifting apparatus according to claim 11 wherein said base frame further includes an elongated support member disposed between and rigidly connected toward opposite ends to that pair of members defining the planar surface which engages that surface on which said lifting apparatus is to be disposed.

13. The lifting apparatus according to claim 11 wherein each end member and each side member has a generally L-shaped configuration, with a longer leg of each L-shaped member being secured to each other and is disposed in a generally vertical orientation when said base frame is assembled thereby adding strength and structural rigidity to the portable lifting apparatus.

14. The lifting apparatus according to claim 11 wherein said actuator includes at least one expandable and retractable fluid operated apparatus.

15. The lifting apparatus according to claim 11 wherein said actuator includes a fluid operated driver having a top plate releasably secured to an undersurface of said table, a bottom plate, and an air bag which expands and retracts as a function of fluid volume therewithin, with said air bag being operably connected and sealed to said top and bottom plates, and wherein said bottom plate is releasably secured with fasteners to the base frame at a distance elevated from said support surface to facilitate access to said fasteners used to releasably secure the bottom plate to the base frame.

16. The lifting apparatus according to claim 15 wherein said bottom plate of said fluid operated driver is connected between that pair of members elevationally disposed above said other pair of members.

17. The lifting apparatus according to claim 11 wherein said gib structure is arranged in operable combination with at least one of said side members of said base frame, with the plate of said gib structure combining with said at least one of said side members of said base frame to define an elongated channel within which a base frame engaging roller moves in response to vertical movements of said table relative to said base frame.

18. The lifting apparatus according to claim 11 wherein said gib structure is arranged in operable combination with both of said side members of said base frame, with the plate of each gib structure combining with an operably associated side member of said base frame to define an elongated channel within which a base frame engaging roller moves in response to vertical movements of said table relative to said base frame.

* * * * *